United States Patent [19]
Richards et al.

[11] Patent Number: 6,151,496
[45] Date of Patent: Nov. 21, 2000

[54] SYSTEM AND METHOD OF PERFORMING SOFT HAND-OFF WITH ONE-DIMENSIONAL AESA

[75] Inventors: Randy J. Richards, Frisco; Gary L. Smith, Garland; Christian O. Hemmi, Plano, all of Tex.

[73] Assignee: Raytheon Company, Lexington, Mass.

[21] Appl. No.: 09/177,754

[22] Filed: Oct. 22, 1998

[51] Int. Cl.[7] .................................................. H04Q 7/20
[52] U.S. Cl. ........................................ 455/428; 455/442
[58] Field of Search ..................... 342/357.15; 455/442, 455/427, 428, 429, 430; 342/357.16

[56] References Cited

U.S. PATENT DOCUMENTS 5,410,728  4/1995  Bertiger et al. .......................... 455/428

*Primary Examiner*—Thomas H. Tarcza
*Assistant Examiner*—Fred H. Mull
*Attorney, Agent, or Firm*—Baker Botts L.L.P.

[57] ABSTRACT

A method of performing a soft hand-off between a first and second satellite traveling on first and second orbiting paths with an one-dimensional active electronically scanned array includes tracking and communicating with a first satellite orbiting in a first orbiting path. A scan plane of the array is then mechanically positioned and aligned so that the scan plane intersects both the first and second orbiting paths of the first and second satellites. The array continues to track and communicate with the first satellite until the first satellite is nearing a predetermined scan limit of the active electronically scanned array. The array is then operated to scan and acquire the second satellite, and establish communications therewith. Tracking and communications with the first satellite is then discontinued.

14 Claims, 2 Drawing Sheets

SYSTEM AND METHOD OF PERFORMING SOFT HAND-OFF WITH ONE-DIMENSIONAL AESA

TECHNICAL FIELD OF THE INVENTION

This invention is related in general to the field of satellite communications. More particularly, the invention is related to a system and method of performing soft hand-off with one-dimensional active electronically scanned array (AESA) antenna.

BACKGROUND OF THE INVENTION

Non-geosynchronous orbit (NGSO) satellites are satellites that continuously move with respect to the earth. To communicate with these satellites, fixed ground terminal receive antennas must continuously track a satellite until it goes out of its tracking range. A hand-off is the process of tracking one given satellite and then the next satellite in the constellation so that communications continue. The most desirable is a soft hand-off in which communications with the next satellite is made prior to breaking communications with the current satellite. Therefore, to perform a soft hand-off, the ground terminal receive antenna must track and communicate with the current satellite while it is simultaneously establishing a communications link with the next satellite.

An active electronically scanned array (AESA) with dual independently steered receive beams is capable of performing a soft hand-off. However, the cost for the size of the array required to provide adequate gain at maximum scan for many non-geosynchronous orbit satellite systems is prohibitive.

A single parabolic dish antenna with a two-dimensional mechanical positioner cannot perform a soft hand-off since it can only communicate with one satellite at a time. The loss of signal while the dish mechanically scans to the next satellite and establishes link is generally unacceptable. The process of scanning to the next satellite, called flyback, and performing a soft hand-off may be achieved by a dual dish system where one dish tracks and communicates with the current satellite and the other dish locates, tracks and establishes link with the next satellite. Although dual dish systems are capable of performing a soft hand-off, there is the added cost and size penalty of the second dish and the two-dimensional mechanical positioner.

SUMMARY OF THE INVENTION

Accordingly, there is a need for an economical satellite communications system that is capable of performing soft hand-offs.

In one aspect of the invention, a method of performing a soft hand-off between a coplanar first and second satellite with a one-dimensional active electronically scanned array includes tracking and communicating with a first satellite orbiting in a first orbiting path. A scan plane of the array is then mechanically positioned and aligned so that the scan plane intersects both the first and second orbiting paths of the first and second satellites. The array continues to track and communicate with the first satellite until the first satellite is nearing a predetermined scan limit of the active electronically scanned array. The array is then operated to scan and acquire the second satellite, and establish communications therewith. Tracking and communications with the first satellite are then discontinued.

In another aspect of the invention, a method of operating a one-dimensional active electronically scanned array includes tracking and communicating with a first satellite orbiting in a first orbital plane, and determining a second orbiting path of a second satellite in a different orbital plane. Thereafter, a scan plane of the array is mechanically positioned and aligned so that the scan plane intersects both the first and second orbiting paths of the first and second satellites. The array continues to track and communicate with the first satellite until the first satellite is nearing a predetermined scan limit of the active electronically scanned array. The array is then operated to scan and acquire the second satellite, and establish communications therewith. Tracking and communications with the first satellite are then discontinued.

In yet another aspect of the invention, a non-geosynchronous orbit satellite communications system includes a one-dimensional active electronically scanned array, and a two-dimensional positioner coupled to the one-dimensional active electronically scanned array operable to mechanically position the array in azimuth and roll.

One technical advantage of the present invention is that soft hand-off can be achieved with only a one-dimensional active electronically scanned array antenna. The present invention requires substantially fewer components than a dual beam two-dimensional active electronically scanned array traditionally used in satellite communications systems. A two-dimensional array requires an amplifier and two phase shifters at each element that make up the array while a one-dimensional array only requires an amplifier and two phase shifters for each row of elements in the array. The present invention is also considerably more economical and more compact compared to known dual antenna systems consisting of two one-dimensional arrays and two two-dimensional mechanical positioners.

BRIEF DESCRIPTION OF THE DRAWINGS

For a better understanding of the present invention., reference may be made to the accompanying drawings, in which.

DETAILED DESCRIPTION OF THE INVENTION

Figure 1:
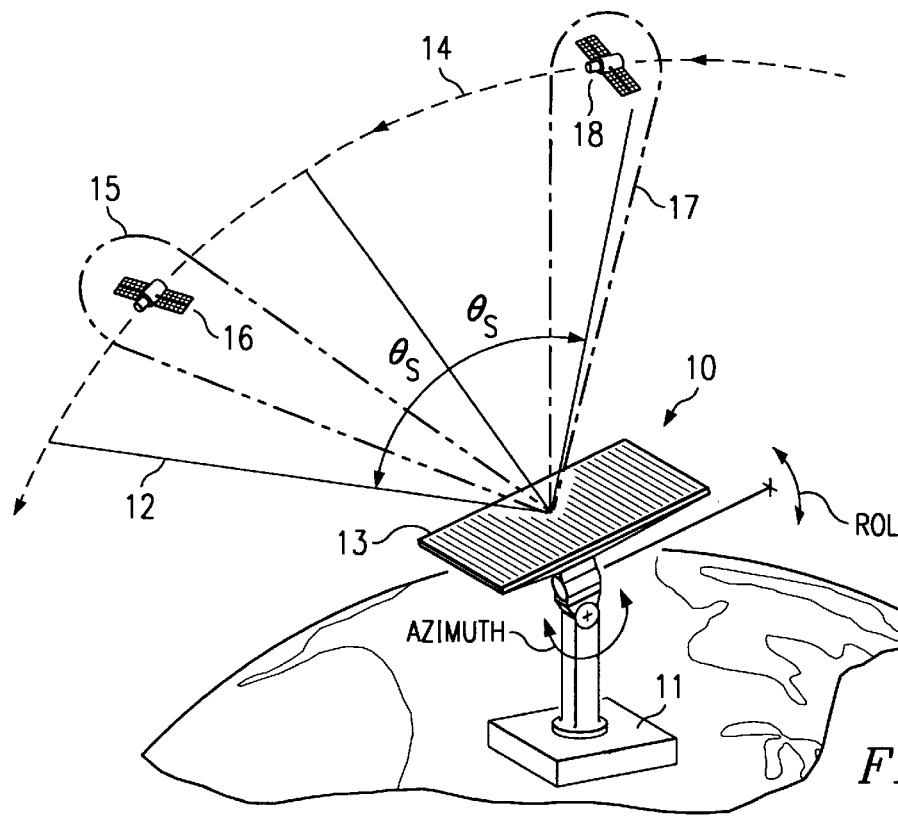
FIG. 1 is a schematic diagram showing a one-dimensional active electronically scanned array with a two-dimensional positioner performing a soft intraplane hand-off according to an embodiment of the present invention.
Figure 2:
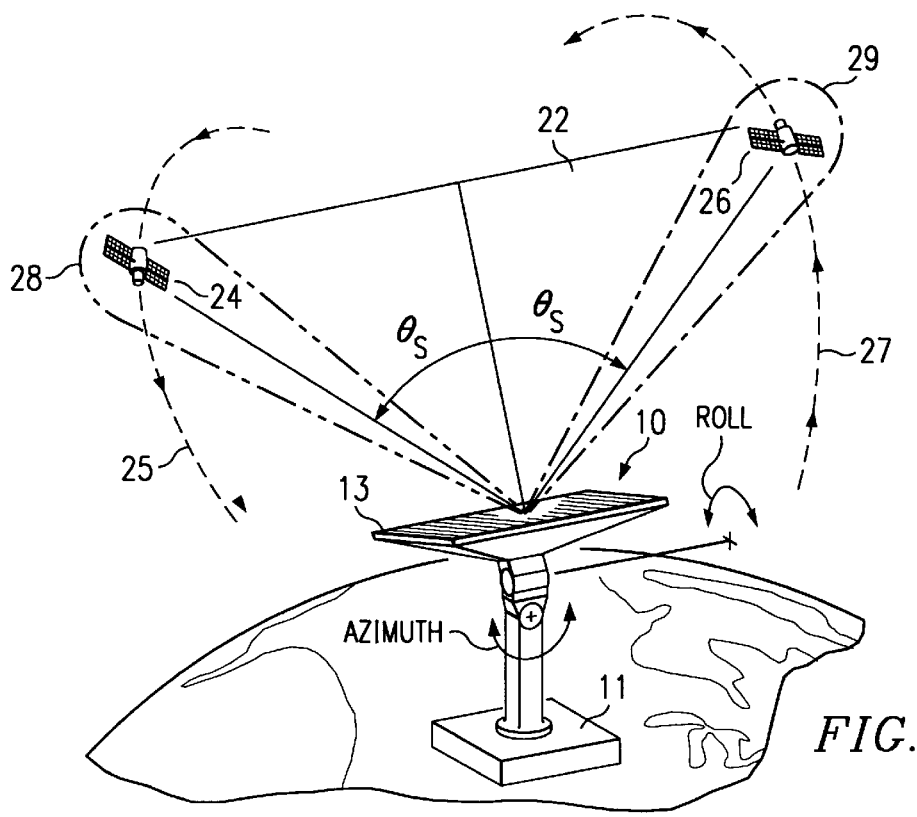
FIG. 2 is a schematic diagram showing a one-dimensional active electronically scanned array with a two-dimensional positioner performing a soft interplane hand-off according to an embodiment of the present invention.
Figure 3:
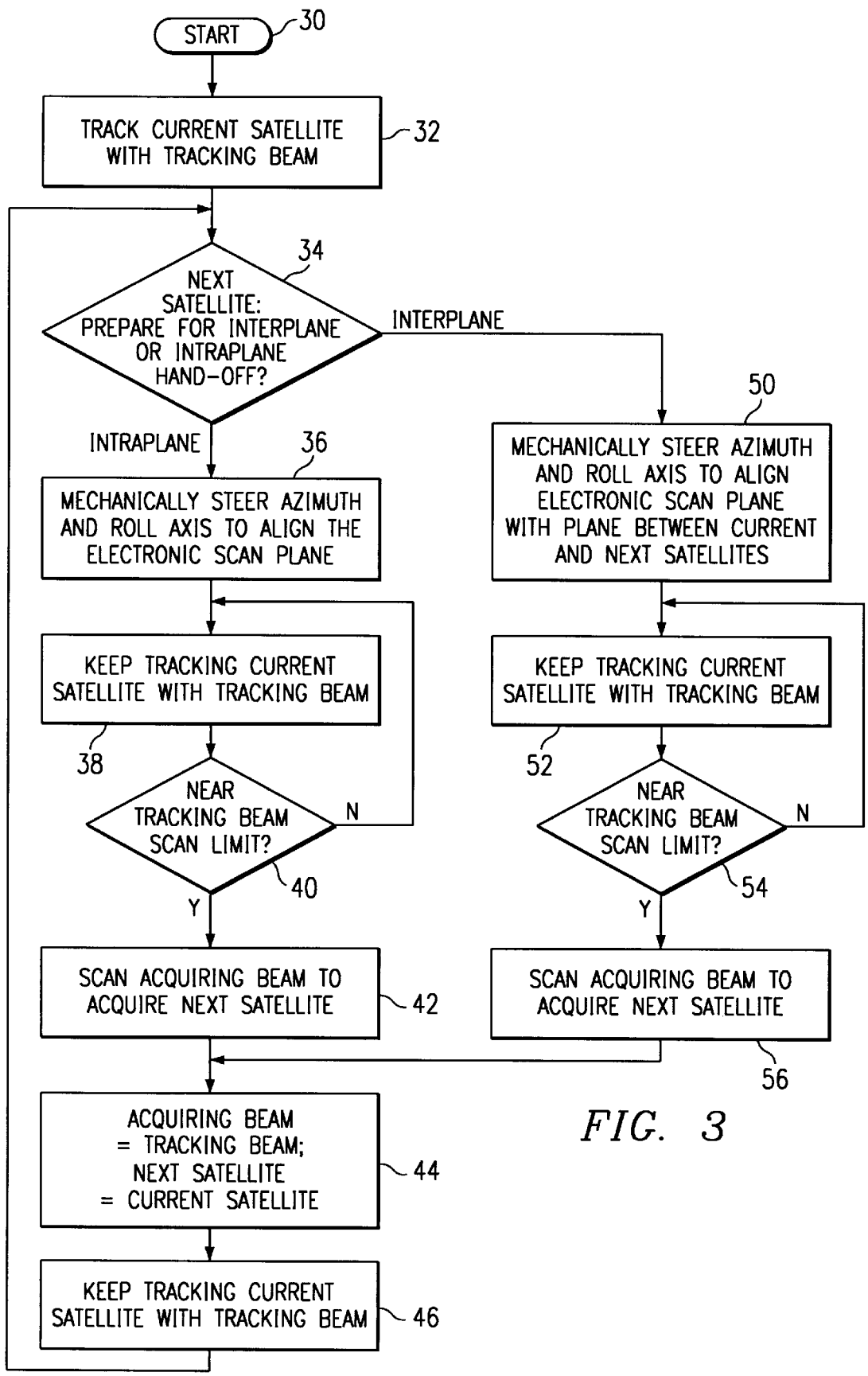
FIG. 3 is a flowchart describing the soft hand-off process according to an embodiment of the present invention.

The preferred embodiments of the present invention are illustrated in FIGS. 1–3, like reference numerals being used to refer to like and corresponding parts of the various drawings.

Referring to FIG. 1, a one-dimensional active electronically scanned array (AESA) antenna 10 with one scanned beam, or alternatively, an antenna with two independently scanned beams is shown. Antenna 10 is mounted on a positioner 11 with two-dimensional positioning capabilities. Two-dimensional positioner 11 can mechanically position or align antenna 10 in azimuth in the first dimension and tilt in roll in the second dimension. Positioner 11 is thus capable of positioning scanned array 13 of antenna 10 so that its electronic scan plane 12 intersects with a satellite 16 that it is currently tracking and communicating with and a next satellite 18 in the constellation. Scan coverage of antenna 10 is $\pm\theta_s$ from zenith. For example, some currently proposed satellite systems require ground terminal antennas with scan coverage of ±65° from zenith and 360° in azimuth. It may be seen that in intraplane hand-off shown in FIG. 1, both satellites 16 and 18 are traveling on the same ascending or descending orbiting path 14.

Constructed and operating in this manner, a first beam 15 of antenna 10 continues tracking and communicating with satellite 16. When beam 15 is near the scan limit defined by $\theta_s$, beam 17 is scanned to $\theta_s$ in the opposite direction to acquire the next ascending satellite 18. Communications with satellite 18 are thus established to perform the soft hand-off. When beam 17, tracking and communicating with ascending satellite 18, is nearing the scan limit, beam 15 then scans to acquire the next ascending satellite.

For some communications systems, such as time division multiple access (TDMA), a single beam one-dimensional active electronic scanned array with a two-dimensional positioner may be used to similarly perform a soft hand-off. The soft hand-off is accomplished by again mechanically positioning antenna 10 so that its electronic scan plane intersects both the current and the next satellite. The single beam is used to rapidly scan back and forth between the current and next satellites during specific time slots of the time division multiple access frame. The system overhead may be slightly increased to allow sufficient time for the single beam to electronically reposition and synchronize with the next satellite while continuing to communicate with the current satellite.

In an interplane hand-off scenario, on the other hand, the satellite that is currently being tracked is traveling on a different ascending or descending orbiting path than the next satellite in the constellation. Referring to FIG. 2, actively scanned electronic array 13 is mechanically positioned by positioner 11 in azimuth and roll so that its scan plane 22 intercepts satellites 24 and 26 traveling in two different orbiting paths 25 and 27, respectively. As shown in FIG. 2, satellite 24 is traveling on descending orbiting path 25 and satellite 26 is traveling on ascending orbiting path 27. Mechanical positioner 11 is rotated in azimuth and in roll to align scan plane 22 of array 13 with both satellites 24 and 26.

Constructed and operating in this manner, a first beam 28 of antenna 10 continues tracking and communicating with satellite 24 with positioner 11 defining scan plane 22 to include array 13 and satellites 24 and 26. When satellite 24 has moved near the scan limit of beam 28 as defined by $\theta_s$, beam 29 is scanned to $\theta_s$ in the opposite direction to acquire the next satellite 26 which is traveling on an ascending orbiting path in a different plane. Communications with satellite 26 are thus established to perform the soft hand-off.

For some communications systems, such as time division multiple access (TDMA), a single beam one-dimensional active electronic scanned array with a two-dimensional positioner may be used to similarly perform a soft hand-off. The soft hand-off is accomplished by mechanically positioning antenna 10 so that its electronic scan plane intersects both the current and the next satellite. The single beam is used to rapidly scan back and forth between the current and next satellites during specific time slots of the time division multiple access frame until communications are established with the next satellite. The system overhead may be slightly increased to allow sufficient time for the single beam to electronically reposition and synchronize with the next satellite while continuing to communicate with the current satellite.

Referring to FIG. 3, a flowchart describing the soft hand-off process beginning in block 30 is shown. The active electronically scanned array antenna uses its first beam to track and communicate with the satellite that is currently overhead, as shown in block 32. This first beam is called a tracking beam, for the purpose of discussion herein. The processor or logic associated with the antenna then prepares for acquiring the next satellite and determines whether an intraplane hand-off or an interplane hand-off is required to acquire the next satellite. Typically, the antenna processor or logic possesses knowledge about the satellite constellation and where in the constellation the current satellite and the next satellite lie. Alternatively, the current satellite may transmit the constellation information to the antenna and may additionally inform it the position of the next satellite.

If it is determined that an intraplane hand-off is required to acquire the next satellite, then the same electronic scan plane is maintained and the current satellite is continually tracked with the tracking beam, as shown in blocks 36 and 38. Intraplane hand-off is shown in FIG. 1, where the current satellite and the next satellite are both traveling in the same orbiting path or plane. While communicating with the current satellite, a determination is made as to whether the current satellite has traveled near the scan limit of the active electronically scanned array, as shown in block 40. This determination may rely on a comparison of the satellite location with a certain predetermined scan limit threshold. If the satellite is not yet near the scan limit of the array, execution loops back to block 38 to continually track the current satellite. If however the satellite is near the scan limit of the antenna, then the second beam is scanned to the opposite direction in the scan plane to acquire the next satellite, as shown in block 42. operating in this manner the second or acquiring beam establishes communications with the next satellite and performs the soft hand-off before breaking communications with the other satellite. At this point in block 44, the acquiring beam becomes the tracking beam since it is now tracking a satellite and the next satellite becomes the current satellite since it is now being tracked. Tracking beam is then used to communicate with the current satellite, as shown in block 46. Execution then proceeds to block 34 to prepare for the next hand-off.

If in block 34 it is determined that an interplane hand-off is what is required to acquire the next satellite, then execution proceeds to block 50. In block 50, the two-dimensional positioner mechanically changes the azimuth and/or roll of the antenna array to align it to a plane intersecting the planes of the current and next satellites, shown in FIG. 2. In block 52, the tracking beam continues to track and communicate with the current satellite, which may require the positioner to continuously change or readjust the orientation of the antenna array. A determination is then made as to whether the current satellite is approaching the scan limit of the antenna array, as shown in block 54. If not, execution returns to block 52 for the tracking beam to continue tracking the current satellite. If, however, the current satellite is near the scan limit of the antenna, then the second or acquiring beam is scanned in the opposite direction from the tracking beam to establish communications with the next satellite, as shown in block 56. A soft hand-off is performed as the acquiring beam acquires the next satellite and communications with the current satellite is broken off. Execution thereafter proceeds to block 44, where the acquiring beam becomes the tracking beam since it is now tracking a satellite and the next satellite becomes the current satellite since it is now being tracked. Tracking beam is then used to communicate with the current satellite, as shown in block 46. Execution then proceeds to block 34 to prepare for the next hand-off.

In the one beam embodiment of the present invention, the process shown in FIG. 3 may be slightly modified to perform a soft hand-off. In blocks 42 and 56 where the acquiring beam is scanned in the opposite direction to acquire the next satellite, the one beam embodiment scans the same tracking beam in the opposite direction of the current satellite to acquire the next satellite. The same beam thus scans rapidly between the two satellites and functions as a tracking beam as well as an acquiring beam simultaneously until communications with the next satellite are accomplished.

Constructed in this manner, the present invention requires substantially less components than a dual beam two-dimensional active electronically scanned array. A dual beam array requires an amplifier and two phase shifters at each element that make up the array while a one-dimensional array only requires an amplifier and two phase shifters for each row of elements in the array. For an array with N elements per row and M elements per column, the two-dimensional array requires (N·M) amplifiers and 2(N·M) phase shifters. In comparison, a one-dimensional array only requires N amplifiers and 2N phase shifters. The cost of the mechanical two-dimensional positioner is greatly offset by the cost savings derived from the reduction in the number of amplifiers and phase shifters. The present invention is also considerably more economical and more compact compared to known dual antenna systems consisting of two two-dimensional arrays and two one-dimensional mechanical positioners.

Although several embodiments of the present invention and its advantages have been described in detail, it should be understood that mutations, changes, substitutions, transformations, modifications, variations, and alterations can be made therein without departing from the teachings of the present invention, the essence, spirit and scope of the invention being set forth by the appended claims.

What is claimed is:

1. A method of performing a soft hand-off between a first and second satellite traveling on first and second orbiting paths with a one-dimensional active electronically scanned array, comprising:

tracking and communicating with the first satellite;

mechanically positioning and aligning a scan plane of the active electronically scanned array so that the scan plane intersects both the first and second orbiting paths of the first and second satellites;

continuing tracking and communicating with the first satellite until the first satellite is nearing a predetermined scan limit of the active electronically scanned array;

scanning and acquiring the second satellite, and establish communications therewith; and discontinuing tracking and communications with the first satellite.

2. The method, as set forth in claim 1, further comprising determining whether the second satellite is orbiting in a different plane than the first satellite and mechanically positioning and aligning the scan plane in response thereto.

3. The method, as set forth in claim 1, further comprising operating a first beam of the active electronically scanned array to track and communicate with the first satellite, and operating a second beam of the active electronically scanned array to acquire the second satellite.

4. The method, as set forth in claim 1, further comprising operating one beam of the active electronically scanned array to track and communicate with the first satellite, and operating the same beam to acquire the second satellite while communicating with the first satellite.

5. The method, as set forth in claim 1, wherein the mechanically positioning step comprises mechanically aligning the scan plane with the first and second orbiting paths of the first and second satellites to perform an intraplane hand-off, the first and second orbiting paths being the same orbiting path.

6. The method, as set forth in claim 1, wherein the mechanically positioning step comprises mechanically aligning the scan plane between the first and second orbiting paths of the first and second satellites to perform an interplane hand-off, the first and second, orbiting paths being different orbiting paths.

7. A method of operating an one-dimensional active electronically scanned array, comprising:

tracking and communicating with a first satellite orbiting in a first orbiting path;

determining a second orbiting path of a second satellite;

mechanically positioning and aligning a scan plane of the active electronically scanned array so that the scan plane intersects both the first and second orbiting paths of the first and second satellites;

continuing tracking and communicating with the first satellite until the first satellite is nearing a predetermined scan limit of the active electronically scanned array;

scanning and acquiring the second satellite, and establish communications therewith; and discontinuing tracking and communications with the first satellite.

8. The method, as set forth in claim 1, further comprising determining whether the second satellite is orbiting in a different plane than the first satellite and mechanically positioning and aligning the scan plane in response thereto.

9. The method, as set forth in claim 1, further comprising operating a first beam of the active electronically scanned array to track and communicate with the first satellite, and operating a second beam of the active electronically scanned array to acquire the second satellite.

10. The method, as set forth in claim 1, further comprising operating one beam of the active electronically scanned array to track and communicate with the first satellite, and operating the same beam to acquire the second satellite while communicating with the first satellite.

11. The method, as set forth in claim 1, wherein the mechanically positioning step comprises mechanically aligning the scan plane with the first and second orbiting paths of the first and second satellites to perform an intraplane hand-off, the first and second orbiting paths being the same orbiting path.

12. The method, as set forth in claim 1, wherein the mechanically positioning step comprises mechanically aligning the scan plane between the first and second orbiting paths of the first and second satellites to perform an interplane hand-off, the first and second orbiting paths being different orbiting paths.

13. The method, as set forth in claim 1, wherein the second satellite determining step comprises receiving information about the second satellite from the first satellite.

14. A non-geosynchronous orbit satellite communications system, comprising:

a one-dimensional active electronically scanned array; and a two-dimensional positioner coupled to the one-dimensional active electronically scanned array operable to mechanically position the array in azimuth and roll.

* * * * *